(12) United States Patent
Onozawa (10) Patent No.: US 10,401,174 B2
(45) Date of Patent: Sep. 3, 2019

(54) POSTURE ESTIMATING APPARATUS FOR ESTIMATING POSTURE, POSTURE ESTIMATING METHOD AND RECORDING MEDIUM

(71) Applicant: CASIO COMPUTER CO., LTD., Shibuya-ku, Tokyo (JP)

(72) Inventor: Masaru Onozawa, Hamura (JP)

(73) Assignee: CASIO COMPUTER CO., LTD., Tokyo (JP)

(*) Notice: Subject to any disclaimer, the term of this patent is extended or adjusted under 35 U.S.C. 154(b) by 540 days.

(21) Appl. No.: 15/208,774

(22) Filed: Jul. 13, 2016

(65) Prior Publication Data

US 2017/0084018 A1   Mar. 23, 2017

(30) Foreign Application Priority Data

Sep. 18, 2015   (JP) ................. 2015-185127

(51) Int. Cl.
| | |
|---|---|
| *G01C 21/16* | (2006.01) |
| *G06T 7/73* | (2017.01) |
| *G06T 7/246* | (2017.01) |
| *G01P 15/18* | (2013.01) |

(52) U.S. Cl.
CPC ............ *G01C 21/165* (2013.01); *G06T 7/246* (2017.01); *G06T 7/73* (2017.01); *G01P 15/18* (2013.01); *G06T 2207/10016* (2013.01); *G06T 2207/30244* (2013.01)

(58) Field of Classification Search
None
See application file for complete search history.

(56) References Cited

U.S. PATENT DOCUMENTS

2014/0139425 A1* 5/2014 Sakai .................. G06F 3/011
                                                    345/156
2014/0176726 A1* 6/2014 Millward ........... H04N 5/23238
                                                    348/169

FOREIGN PATENT DOCUMENTS

| JP | 05-176218 | 7/1993 |
| JP | 2002-16836 | 1/2002 |
| JP | 2002-158525 | 5/2002 |
| JP | 2007-114466 | 5/2007 |
| JP | 2014-18291 | 2/2014 |

(Continued)

OTHER PUBLICATIONS

Japanese Office Action for Japanese Patent Application No. 2015-185127 dated Aug. 1, 2017.

(Continued)

*Primary Examiner* — Matthew C Bella
*Assistant Examiner* — Brian D Shin
(74) *Attorney, Agent, or Firm* — Amin, Turocy & Watson LLP (57) ABSTRACT

An imaging apparatus of the present invention includes an acceleration detecting unit for detecting a vector of a first direction based on an output signal from a three-axis acceleration sensor, an angle obtaining unit for obtaining a relative rotation angle around a roll axis among a plurality of frame images sequentially captured, and a direction estimating unit for estimating a direction of gravity different from the first direction based on the obtained relative rotation angle around the roll axis and the detected vector of the first direction. Thus, it is possible to estimate a posture of the apparatus more properly.

20 Claims, 3 Drawing Sheets

(56) References Cited

FOREIGN PATENT DOCUMENTS

| | | |
|---|---|---|
| JP | 5614527 | 9/2014 |
| JP | 2014-196941 | 10/2014 |
| JP | 2015-095045 | 5/2015 |
| JP | 2015-119259 | 6/2015 |

OTHER PUBLICATIONS

Japanese Office Action for Japanese Patent Application No. 2015-185127 dated Oct. 17, 2017.

* cited by examiner

FIG. 2

POSTURE ESTIMATING APPARATUS FOR ESTIMATING POSTURE, POSTURE ESTIMATING METHOD AND RECORDING MEDIUM

CROSS-REFERENCE TO RELATED APPLICATIONS

This application is based upon and claims the benefit of priority under 35 USC 119 of Japanese Patent Application No. 2015-185127 filed on Sep. 18, 2015, the entire disclosure of which is incorporated herein by reference in its entirety for all purposes.

BACKGROUND OF THE INVENTION

1. Field of the Invention

The present invention relates to a posture estimating apparatus, a posture estimating method, and a computer readable recording medium for recording a program thereon for estimating a posture.

2. Description of the Related Art

Conventionally, an imaging apparatus exists for performing posture estimation of the apparatus or image stabilization based on a vector of a first direction detected by a signal output from an acceleration sensor. Further, there has been known a technology relating to a motion sensor for performing the posture estimation with high accuracy and estimating a direction of gravity different from the first direction by a Kalman filter by using a rotation angle detected by a signal output from an angular velocity sensor in addition to the vector of the first direction obtained from the output signal from the acceleration sensor, as disclosed in Japanese Patent No. 5614527.

SUMMARY OF THE INVENTION

According to an aspect of the present invention, a posture estimating apparatus is provided. The posture estimating apparatus includes a processor and a computer-readable medium in which a computer program is stored. Further, the computer program causes the processor to perform operations to detect a vector of a first direction based on an output signal from an acceleration sensor, acquire a plurality of images sequentially captured, obtain a relative rotation angle around a first axis among the plurality of images based on the acquired plurality of images, and estimate a second direction different from the first direction based on the obtained relative rotation angle around the first axis and the detected vector of the first direction.

According to another aspect of the present invention, a posture estimating method performed by a posture estimating apparatus is provided. The posture estimating method includes detecting a vector of a first direction based on an output signal from an acceleration sensor, acquiring a plurality of images sequentially captured, obtaining a relative rotation angle around a first axis among the plurality of images based on the acquired plurality of images, and estimating a second direction different from the first direction based on the obtained relative rotation angle around the first axis and the detected vector of the first direction.

According to another aspect of the present invention, a non-transitory computer-readable recording medium for recording a computer program is provided. The computer program causes a processor of a posture estimating apparatus to perform operations to detect a vector of a first direction based on an output signal from an acceleration sensor, acquire a plurality of images sequentially captured, obtain a relative rotation angle around a first axis among the plurality of images based on the acquired plurality of images, and estimate a second direction different from the first direction based on the obtained relative rotation angle around the first axis and the detected vector of the first direction.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

Here.

DETAILED DESCRIPTION OF THE PREFERRED EMBODIMENT

Hereinafter, embodiments of the present invention will be described with reference to the accompanying drawings. The scope of the invention is not intended to be limited to the illustrated examples.

Figure 1:
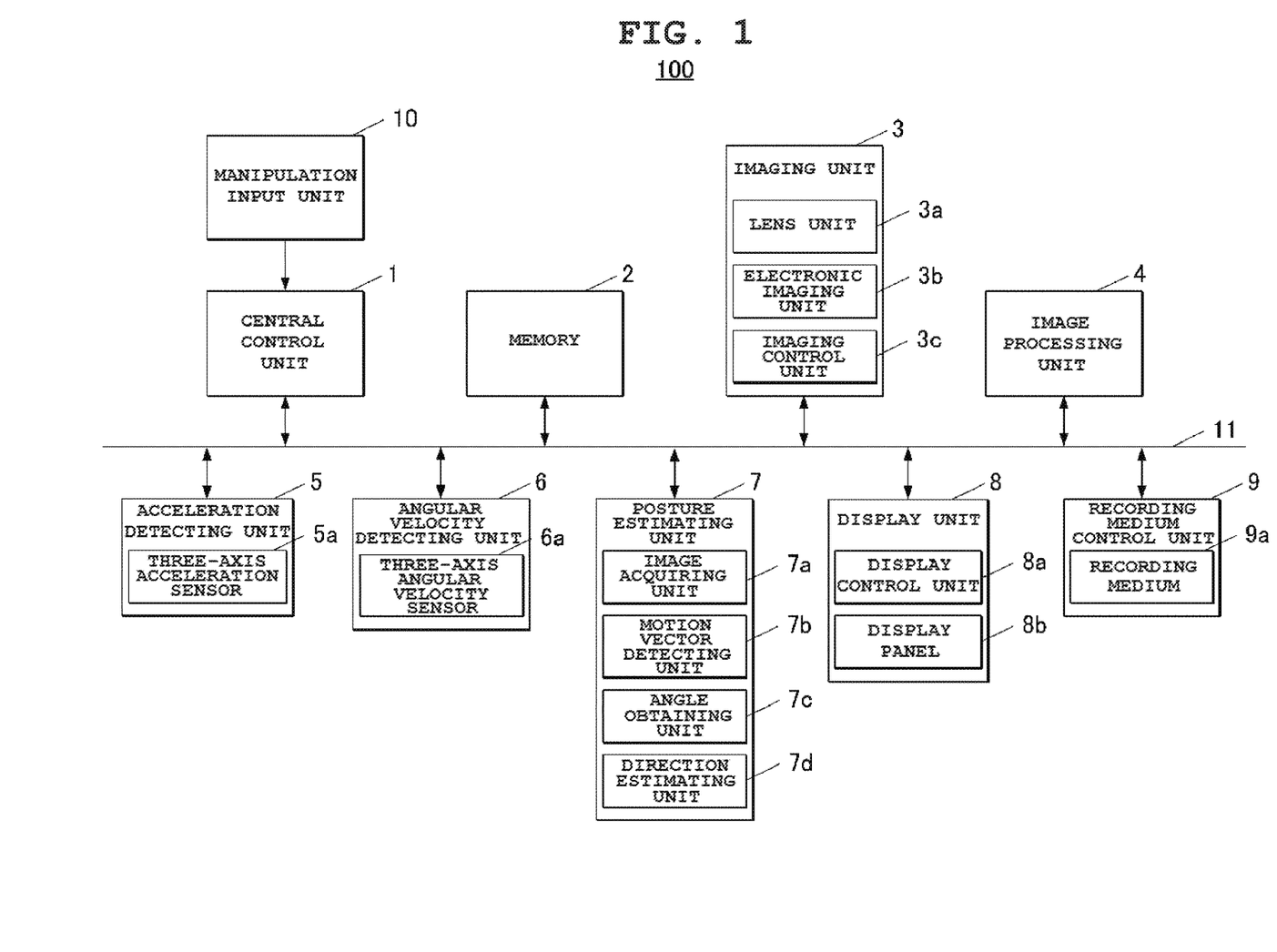
FIG. 1 is a block diagram showing an outlined configuration of an imaging apparatus according to an embodiment to which the present invention is applied.
Figure 2:
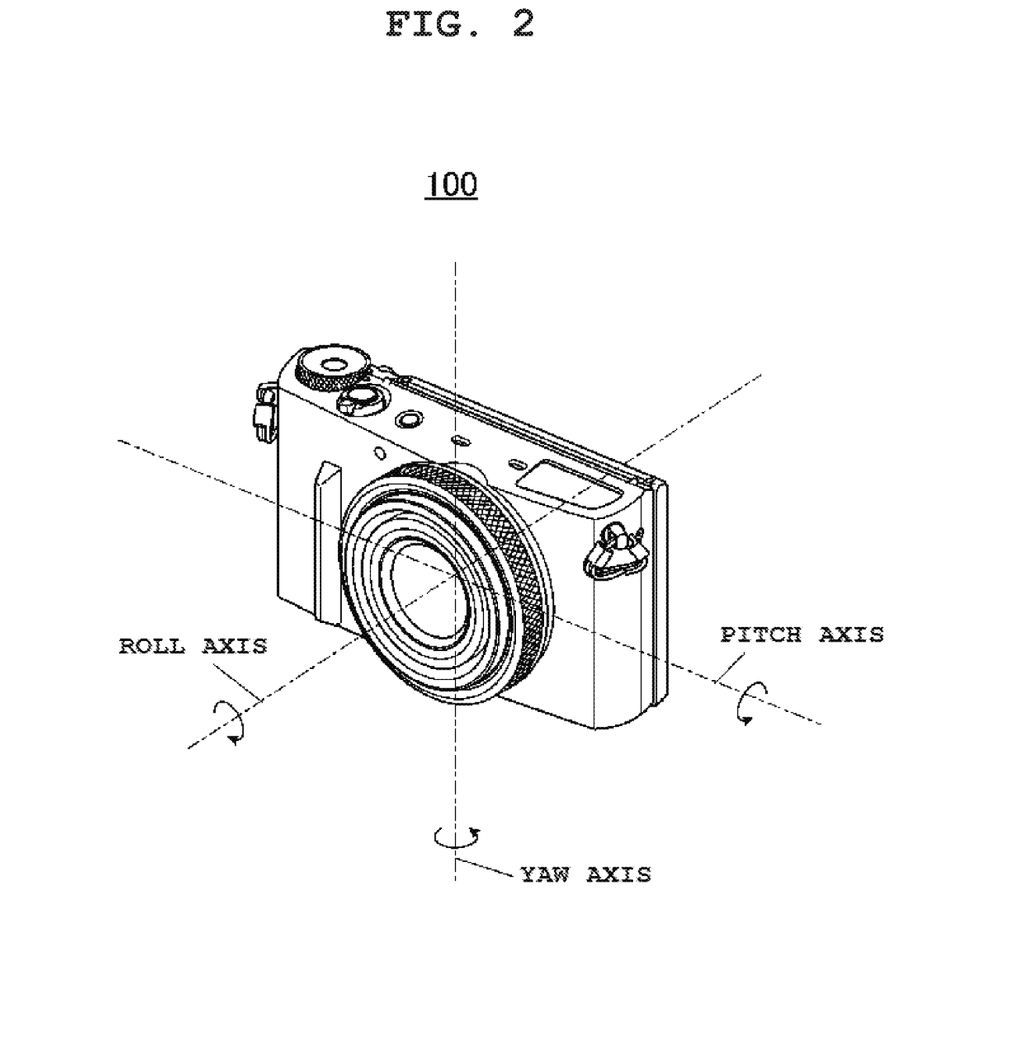
FIG. 2 is a drawing showing a roll axis, a pitch axis and a yaw axis of the imaging apparatus of FIG. 1 schematically.

FIG. 1 is a block diagram showing an outlined configuration of an imaging apparatus 100 according to an embodiment to which the present invention is applied. FIG. 2 is a drawing showing a roll axis, a pitch axis and a yaw axis of the imaging apparatus 100 schematically.

As shown in FIG. 1, the imaging apparatus 100 of the present embodiment includes a central control unit 1, a memory 2, an imaging unit 3, an image processing unit 4, an acceleration detecting unit 5, an angular velocity detecting unit 6, a posture estimating unit 7, a display unit 8, a recording medium control unit 9, and a manipulation input unit 10.

Further, the central control unit 1, the memory 2, the imaging unit 3, the image processing unit 4, the acceleration detecting unit 5, the angular velocity detecting unit 6, the posture estimating unit 7, the display unit 8, and the recording medium control unit 9 are connected via a bus line 11 with each other.

The imaging apparatus 100 can be realized by a known product including not only a digital camera of which main function is to take pictures as in the present embodiment, but also a mobile terminal having a picture-taking function which is not its main function, such as a mobile phone and a smart phone.

The central control unit 1 controls each unit of the imaging apparatus 100. More specifically, the central control unit 1 includes a CPU (Central Processing Unit), a RAM (Random Access Memory), and a ROM (Read Only Memory) which are not shown in the drawings, and performs various control operations according to various programs for the imaging apparatus 100 (which are not shown in the drawings).

The memory 2 includes, for example, a DRAM (Dynamic Random Access Memory) and temporarily stores data processed by each unit such as the central control unit 1 or the posture estimating unit 7.

The imaging unit 3 takes an image of a subject. More specifically, the imaging unit 3 includes a lens unit 3a, an electronic imaging unit 3b, and an imaging control unit 3c.

The lens unit 3a includes a plurality of lenses such as a zoom lens or a focus lens.

The electronic imaging unit 3b includes an image sensor such as a CCD (Charge Coupled Device) or a CMOS (Complementary Metal-oxide Semiconductor), and converts an optical image which has passed various lenses of the lens unit 3a into a two-dimensional image signal.

The imaging unit 3 may include a diaphragm (not shown in the drawings) for regulating the amount of light that passes through the lens unit 3a.

The imaging control unit 3c controls taking the image of the subject by the imaging unit 3. The imaging control unit 3c includes a timing generator, a driver, and the like (not shown in the drawings). Further, the imaging control unit 3c drives scanning of the electronic imaging unit 3b by the timing generator and the driver to convert the optical image into the two-dimensional image signal every predetermined period by the electronic imaging unit 3b, reads out a frame image for each screen from an imaging region of the electronic imaging unit 3b and outputs the frame image to the image processing unit 4.

Further, the imaging control unit 3c performs control for adjusting conditions of taking the image of the subject such as AF (auto-focus), AE (auto-exposure), and AWB (auto white balance).

The image processing unit 4 adjusts gain of each color component of RGB for an analog signal of the frame image forwarded from the electronic imaging unit 3b of the imaging unit 3. Then, the image processing unit 4 executes sampling and holding by a sample and hold circuit (not shown in drawings), executes conversion into digital data by an A/D converter (not shown in drawings), and executes color processing including pixel interpolation processing and γ correction processing by a color processing circuit (not shown in drawings). Then, the image processing unit 4 generates a digital brightness signal Y and color difference signals Cb and Cr (YUV data). Further, the image processing unit 4 may output the generated brightness signal Y and color difference signals Cb and Cr to the memory 2 used as a buffer memory.

In the case of recording the image, the image processing unit 4 encodes the generated brightness signal Y and color difference signals Cb and Cr according to a predetermined encoding scheme (for example, a JPEG format, a motion JPEG format, an MPEG format, and the like) and outputs the encoded signals to the recording medium control unit 9.

In the case of displaying the image, the image processing unit 4 decodes data of a still picture or a moving picture to be displayed which is read out from a recording medium 9a (which will be described later) or the like according to the corresponding predetermined decoding scheme and outputs the decoded data to the display unit 8. The image processing unit 4 may reduce the resolution of the decoded data to a predetermined size (for example, VGA or QVGA) based on a display resolution of a display panel 8b and the like, and output the data to the display unit 8.

The acceleration detecting unit (a first detecting unit) 5 detects a vector of a first direction.

For example, the acceleration detecting unit 5 includes a three-axis acceleration sensor 5a for detecting acceleration in each of the directions of three axes of a body of the imaging apparatus 100 lying at right angles to each other and detects the vector of the first direction based on an output signal from the three-axis acceleration sensor 5a. More specifically, the acceleration detecting unit 5 detects the vector of the first direction based on a time average of the output signal of the acceleration in the directions of the three axes detected by the three-axis acceleration sensor 5a. As the three-axis acceleration sensor 5a detects translational acceleration in addition to an acceleration of gravity, the first direction is usually different from the direction of gravity (a second direction).

The above mentioned method of generating the vector of the first direction is an example and the present invention is not limited to this. The method may be arbitrarily modified.

The value of the vector of the first direction detected by the acceleration detecting unit 5 can be temporarily stored in a predetermined storage unit (for example, the memory 2).

The angular velocity detecting unit (a third detecting unit) 6 detects angular velocity around the first axis.

For example, the first axis can be the roll axis or the pitch axis of the body of the imaging apparatus 100 (see FIG. 2). In the embodiment described in the following, the roll axis is the first axis.

For example, the angular velocity detecting unit 6 includes a three-axis angular velocity sensor 6a for detecting angular velocity of a rotational motion with respect to each of three axes of the body of the imaging apparatus 100 lying at right angles to each other (the roll axis, the pitch axis, and the yaw axis) and detects angular velocity around the roll axis (the first axis) of the body of the imaging apparatus 100 based on an output signal from the three-axis angular velocity sensor 6a. More specifically, the angular velocity detecting unit 6 detects the angular velocity around the first axis based on a time average of the output signal of the angular velocity of the rotational motion with respect to the three axes detected by the three-axis angular velocity sensor 6a.

The value of the angular velocity around the roll axis (the first axis) detected by the angular velocity detecting unit 6 can be temporarily stored in the predetermined storage unit (for example, the memory 2).

The posture estimating unit 7 includes an image acquiring unit 7a, a motion vector detecting unit 7b, an angle obtaining unit 7c, and a direction estimating unit 7d.

For example, each unit of the posture estimating unit 7 includes a predetermined logic circuit. The present invention is not limited to this.

The image acquiring unit (an acquiring unit) 7a acquires a plurality of images sequentially captured.

For example, when shooting the image of the subject by the imaging unit 3, the image acquiring unit 7a sequentially acquires image data of a plurality of frame images relating to live view images sequentially generated by the image processing unit 4 from the memory 2.

The motion vector detecting unit (a second detecting unit) 7b detects a motion vector of a feature point among the plurality of frame images.

The motion vector detecting unit 7b detects the motion vector of the feature point among the plurality of frame images sequentially captured by the imaging unit 3 and acquired by the image acquiring unit 7a. More specifically, the motion vector detecting unit 7b performs feature detecting processing for the plurality of frame images acquired by the image acquiring unit 7a, for example. Then, the motion vector detecting unit 7b sets one frame image of the plurality of frame images as a reference frame image and selects block areas having distinguishing features (i.e. feature points) of a predetermined number from the reference frame image. Then, the motion vector detecting unit 7b detects contents of the block as a template (for example, a square of 8×8 pixels). Further, the motion vector detecting unit 7b determines which part of the frame image of the plurality of frame images following (or preceding) the reference frame image on the time axis corresponds to each template. In other words, the motion vector detecting unit 7b determines a position (or a corresponding area) in a target image which matches pixel values of each template. The motion vector detecting unit 7b obtains the motion vector of the template by determining a best evaluation value of differences of pixel values. For example, an evaluation value is a Sum of Squared Differences (SSD) or a Sum of Absolute Differences (SAD).

The motion vector detecting unit 7b integrates all of the motion vectors obtained for all of the feature points to obtain the motion vector of the whole of one frame image.

The above mentioned method of detecting the motion vector is an example and the present invention is not limited to this. The method may be arbitrarily modified.

The angle obtaining unit (an obtaining unit) 7c obtains a relative rotation angle around the first axis among the plurality of frame images.

Based on the plurality of frame images acquired by the image acquiring unit 7a, the angle obtaining unit 7c obtains the relative rotation angle around the roll axis (the first axis) among the plurality of frame images. More specifically, the angle obtaining unit 7c obtains the relative rotation angle around the roll axis (the first axis) among the plurality of frame images based on the motion vector detected by the motion vector detecting unit 7b.

A specific method for obtaining the relative rotation angle based on the motion vector among the plurality of frame images is not explained in detail here because it is well known in an art. For example, based on the motion vector of the whole of one frame image detected by the motion vector detecting unit 7b, the angle obtaining unit 7c obtains parameters of a linear transformation (for example, an affine transformation) for rotating the image with respect to the roll axis (the first axis) and obtains the relative rotation angle of the frame image with respect to the reference frame image.

The above mentioned method of obtaining the relative rotation angle is an example and the present invention is not limited to this. The method may be arbitrarily modified.

The angle obtaining unit 7c may obtain the relative rotation angle around the roll axis (the first axis) based on the angular velocity around the roll axis (the first axis) detected by the angular velocity detecting unit 6 in the case that it is impossible to detect the motion vector by the motion vector detecting unit 7b.

For example, it is impossible to detect the motion vector from images taken at a dark place in which feature points are difficult to be distinguished or uniform images. Thus, the angle obtaining unit 7c determines whether or not the motion vector detecting unit 7b can detect the motion vector based on an amount of deviation of pixel values or brightness (a degree of non-uniformity) of the live view images, for example. In the case of determining that the motion vector detecting unit 7b cannot detect the motion vector, the angle obtaining unit 7c obtains the relative rotation angle around the roll axis (the first axis) based on the angular velocity around the roll axis (the first axis) detected by the angular velocity detecting unit 6.

The direction estimating unit 7d estimates the direction of gravity (the second direction).

The direction estimating unit (an estimating unit) 7d estimates the direction of gravity (the second direction) based on the relative rotation angle around the roll axis (the first axis) obtained by the angle obtaining unit 7c and the vector of the first direction detected by the acceleration detecting unit 5. More specifically, the direction estimating unit 7d obtains a rotation angle around the roll axis (the first axis) of the imaging apparatus 100 by a Kalman filter based on the relative rotation angle around the roll axis (the first axis) and the vector of the first direction. Further, the direction estimating unit 7d estimates the direction of gravity (the second direction) by finding the posture of the imaging apparatus 100 (a tilt with respect to the direction of gravity (the second direction)) from the obtained rotation angle around the roll axis (the first axis).

As the method of estimating the direction of gravity (the second direction) by using the Kalman filter is well known in the art, its detailed description is omitted. For example, a state space model is given by expression (1) showing a state equation and expression (2) showing an observation equation:

$$x_{t+1} = A_t x_t + R_t u_t + w_t \qquad (1)$$

$$y_t = H_t x_t + v_t \qquad (2)$$

Here, $x_t$ is the rotation angle around the roll axis (the first axis), $u_t$ is the relative rotation angle around the roll axis (the first axis) obtained from the motion vector or the angular velocity, $R_t$ is a rotation matrix, each of $A_t$ and $H_t$ is a unit matrix, $y_t$ is a vector in the direction of gravity, and $w_t$ and $v_t$ are system noise and observation noise, respectively.

The display unit 8 includes a display control unit 8a and the display panel 8b.

The display control unit 8a controls the display panel 8b to display an image in its display area based on image data of a predetermined size which has been read out from the memory 2 and/or the recording medium 9a and decoded by the image processing unit 4. More specifically, the display control unit 8a includes a VRAM (Video Random Access Memory), a VRAM controller, a digital video encoder, and the like. The digital video encoder reads the brightness signal Y and the color difference signals Cb and Cr, which have been decoded by the image processing unit 4 and recorded in the VRAM (not shown in the drawings), via the VRAM controller from the VRAM at a predetermined playback frame rate. The digital video encoder generates a video signal based on the data and outputs it to the display panel 8b.

The display panel 8b displays an image taken by the imaging unit 3 in the display area based on the video signal from the display control unit 8a. More specifically, the display panel 8b displays live view images by sequentially updating the plurality of frame images generated by imaging of the subject by the imaging unit 3 in the still picture taking mode or the moving picture taking mode at a predetermined frame rate. Further, the display panel 8b displays the still picture (a REC view image) of the subject recorded in the recording medium 9a or the moving picture of the subject which is being taken.

For example, the display panel 8b may include a liquid crystal display (LCD) panel, an organic EL (Electro-Luminescence) display panel, or the like, without limitation.

The recording medium 9a can be removable from the recording medium control unit 9. The recording medium control unit 9 controls reading/writing of data from/to the recording medium 9a.

For example, the recording medium 9a includes a nonvolatile memory such as a flash memory, and the like.

The manipulation input unit 10 is used to manipulate the imaging apparatus 100 in predetermined manners. More specifically, the manipulation input unit 10 includes a manipulation unit (not shown in the drawings) such as a shutter button relating to an instruction to shoot the image of the subject, a selection button relating to an instruction to select a shooting mode, a function, or the like, and a zoom button relating to an instruction to adjust an amount of zooming.

In the case that a user manipulates a button, the manipulation input unit 10 outputs an instruction of operation according to the manipulated button to the central control unit 1. The central control unit 1 controls each unit to execute a predetermined action (for example, shooting the image of the subject) according to the instruction of operation inputted from the manipulation input unit 10.

The manipulation input unit 10 may include a touch panel (not shown in the drawings) which is incorporated into the display panel 8b of the display unit 8.

<Posture Estimation Process>

In the following, a posture estimation process will be described with reference to FIG. 3.

Figure 3:
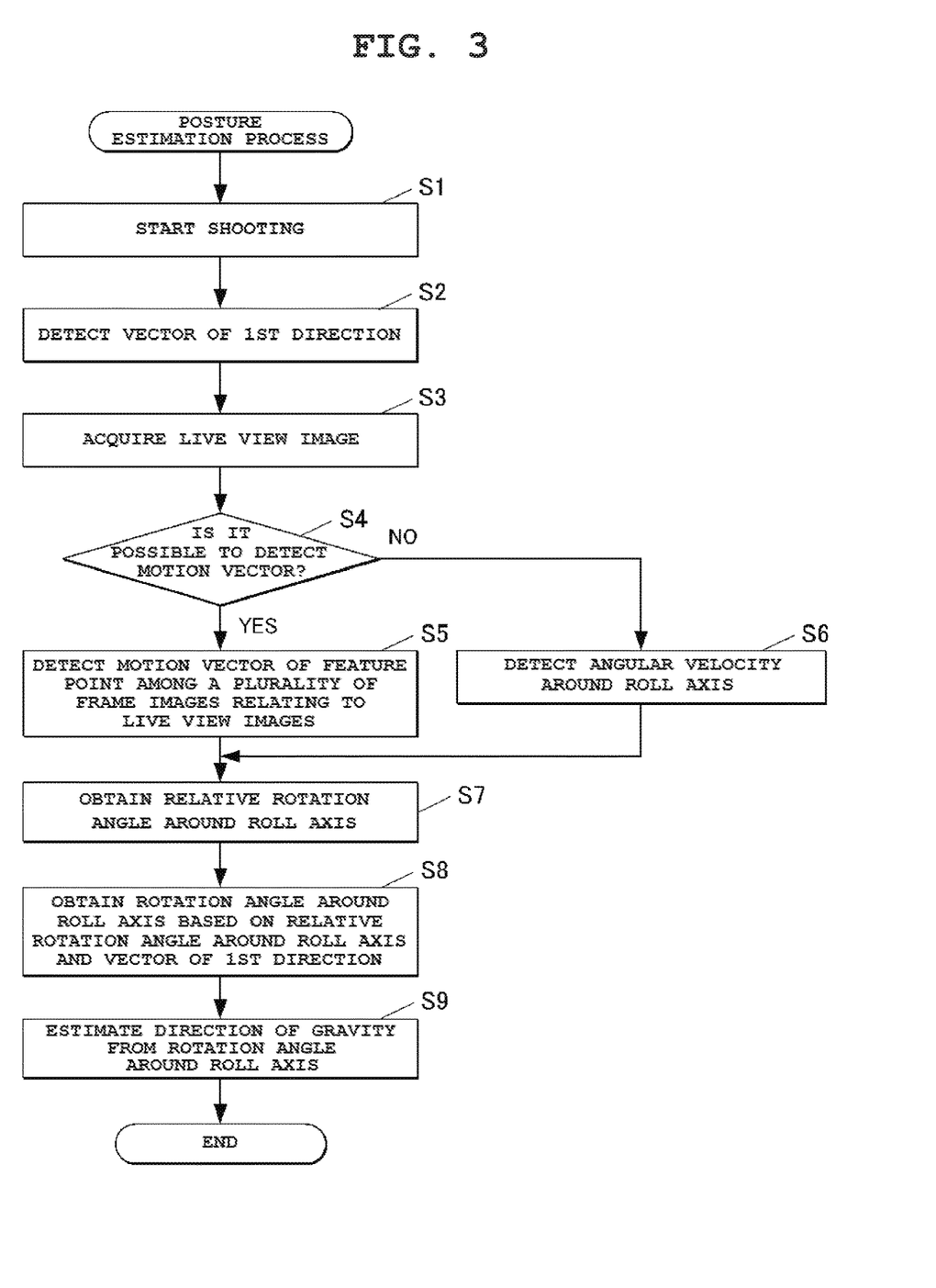
FIG. 3 is an exemplary flow chart for showing steps of a posture estimation process performed by the imaging apparatus shown in FIG. 1.

FIG. 3 is an exemplary flow chart for showing steps of the posture estimation process.

The posture estimation process may be performed during taking the image of the subject or when a predetermined manipulation of the shutter button (for example, half-press or full-press of the shutter button) of the manipulation input unit 10 is performed by the user, for example.

As shown in FIG. 3, in the case that the imaging unit 3 starts shooting the image of the subject (Step S1), the acceleration detecting unit 5 detects the vector of the first direction based on the output signal from the three-axis acceleration sensor 5a (Step S2). The image acquiring unit 7a sequentially acquires image data of the plurality of frame images relating to the live view images sequentially generated by the image processing unit 4 from the memory 2 (Step S3).

The order of the detection of the vector of the first direction at Step S2 and the acquisition of the plurality of frame images at Step S3 is an example and the present invention is not limited to this. The order of the steps may be reversed.

Then, the angle obtaining unit 7c determines whether or not it is possible to detect the motion vector of the feature point among the plurality of frame images by the motion vector detecting unit 7b (Step S4).

In the case it is determined that it is possible to detect the motion vector (Step S4: YES), the motion vector detecting unit 7b detects the motion vector of the feature point among the plurality of frame images acquired by the image acquiring unit 7a (Step S5).

In the case it is determined that it is impossible to detect the motion vector (Step S4: NO), the angular velocity detecting unit 6 detects the angular velocity around the roll axis (the first axis) of the body of the imaging apparatus 100 based on the output signal from the three-axis angular velocity sensor 6a (Step S6). The detection of the angular velocity around the roll axis (the first axis) may be performed all the time during the posture estimation process.

The angle obtaining unit 7c obtains the relative rotation angle around the roll axis (the first axis) among the plurality of frame images (Step S7). More specifically, in the case that the motion vector is detected by the motion vector detecting unit 7b at Step S5, the angle obtaining unit 7c obtains the relative rotation angle around the roll axis (the first axis) among the plurality of frame images based on the detected motion vector. On the other hand, in the case that the angular velocity around the roll axis (the first axis) is detected by the angular velocity detecting unit 6 at Step S6, the angle obtaining unit 7c obtains the relative rotation angle around the roll axis (the first axis) based on the detected angular velocity around the roll axis (the first axis).

The direction estimating unit 7d obtains the rotation angle around the roll axis (the first axis) of the imaging apparatus 100 by the Kalman filter based on the relative rotation angle around the roll axis (the first axis) obtained by the angle obtaining unit 7c and the vector of the first direction detected by the acceleration detecting unit 5 (Step S8). The direction estimating unit 7d estimates the direction of gravity (the second direction) from the obtained rotation angle around the roll axis (the first axis) (Step S9).

After that, the posture estimation process ends.

According to the imaging apparatus 100 of the present embodiment, no angular velocity sensor which increases power consumption is necessary to estimate the direction of gravity (the second direction) because it is estimates based on the vector of the first direction detected based on the output signal from the three-axis acceleration sensor 5a and the relative rotation angle around the roll axis (the first axis) among the plurality of frame images sequentially captured. In specific, by detecting the motion vector of the feature point among the plurality of frame images sequentially captured by the imaging unit 3, it is possible to obtain the relative rotation angle around the roll axis (the first axis) among the plurality of frame images based on the detected motion vector. Further, it is possible to properly estimate the direction of gravity (the second direction) by obtaining the rotation angle around the roll axis (the first axis) of the imaging apparatus 100 by the Kalman filter based on the obtained relative rotation angle around the roll axis (the first axis) and the vector of the first direction.

Thus, it is possible to acquire the relative rotation angle around the roll axis (the first axis) among the plurality of frame images sequentially captured. Therefore, it is possible to more properly perform estimation of the posture of the imaging apparatus 100 for an image stabilization, for example.

Further, in the case that the motion vector of the feature point cannot be detected among the plurality of frame images, the angular velocity around the roll axis (the first axis) is detected based on the output signal from the three-axis angular velocity sensor 6a. By this, it is possible to obtain the relative rotation angle around the roll axis (the first axis) based on the angular velocity around the roll axis (the first axis) detected by using the three-axis angular velocity sensor 6a even for images taken at the dark place in which feature points are difficult to be distinguished or uniform images, for example. Therefore, it is possible to properly estimate the direction of gravity (the second direction) by using the obtained relative rotation angle around the roll axis (the first axis).

In addition, the present invention is not limited to the embodiments described above and various modification or design changes of the embodiments can be made without departing from the scope and spirit of the invention.

For example, in the embodiments described above, the direction of gravity is the second direction, and the roll axis or the pitch axis of the imaging apparatus 100 is the first axis. However, the present invention is not limited to these embodiments and can be modified arbitrarily.

The configuration of the imaging apparatus 100 of the embodiment is merely an example, and the present invention is not limited to this configuration. The imaging apparatus 100 is an example of the posture estimating apparatus of the present invention, and the posture estimating apparatus can be realized by different apparatus without limitation.

According to the embodiments described above, the functions of the first detecting unit, the acquiring unit, the obtaining unit, and the estimating unit are realized by driving the acceleration detecting unit 5, the image acquiring unit 7a, the angle obtaining unit 7c, and the direction estimating unit 7d, respectively, under the control of the central control unit 1. However, the present invention is not limited to the above and the functions may be realized by executing a predetermined program by the CPU of the central control unit 1.

In other words, a program including a first detecting processing routine, an acquiring processing routine, an obtaining processing routine, and an estimating processing routine is stored in a program memory (not shown in the drawings). The CPU of the central control unit 1 can function as a circuit for detecting the vector of the first direction based on the output signal from the acceleration sensor according to the first detecting processing routine. The CPU of the central control unit 1 can function as a circuit for acquiring the plurality of images sequentially captured according to the acquiring processing routine. The CPU of the central control unit 1 can function as a circuit for obtaining the relative rotation angle around the first axis among the plurality of images based on the acquired plurality of images according to the obtaining processing routine. The CPU of the central control unit 1 can function as a circuit for estimating the second direction different from the first direction based on the obtained relative rotation angle around the first axis and the detected vector of the first direction according to the estimating processing routine.

Similarly, the second detecting unit and the third detecting unit may be realized by executing the predetermined program by the CPU of the central control unit 1.

In addition, a computer readable recording medium for recording the program for executing the respective processing can be a ROM, a hard disk, a non-volatile memory such as a flash memory, a portable recording medium such as a CD-ROM, or the like. A carrier wave can be used as a medium for providing program data through a predetermined communication line.

Although some embodiments of the present invention have been described above, the embodiments are for illustrative purposes only and not intended to limit the technical scope of the present invention. It will be evident that there are many other possible embodiments of the present invention and various modifications such as omission or substitution may be made without departing from the spirit of the invention. These embodiments and modifications fall within the scope and the spirit of the invention described in this specification and within the scope of the invention as defined in the appended claims and equivalents thereof.

What is claimed is:

1. A posture estimating apparatus comprising:
a processor; and
a computer-readable medium in which a computer program is stored,
the computer program causes the processor to perform operations to:
detect a vector of a first direction based on an output signal from an acceleration sensor;
acquire a plurality of images sequentially captured;
obtain a relative rotation angle around a first axis among the plurality of images based on the acquired plurality of images; and
estimate a second direction different from the first direction based on the obtained relative rotation angle around the first axis and the detected vector of the first direction.

2. The posture estimating apparatus of claim 1, wherein the computer program causes the processor to further perform an operation to detect a motion vector of a feature point among the acquired plurality of images,
wherein the operation obtains the relative rotation angle around the first axis among the plurality of images based on the detected motion vector.

3. The posture estimating apparatus of claim 2, wherein the computer program causes the processor to further perform an operation to detect an angular velocity around the first axis based on an output signal from an angular velocity sensor,
wherein the operation obtains the relative rotation angle around the first axis based on the detected angular velocity around the first axis in the case that the motion vector cannot be detected.

4. The posture estimating apparatus of claim 3, wherein the angular velocity sensor includes a three-axis angular velocity sensor configured to detect angular velocity of a rotational motion with respect to each of three axes of a body of the posture estimating apparatus lying at right angles to each other,
wherein the operation detects the angular velocity around the first axis based on a time average of the output signal of the angular velocity of the rotational motion with respect to the three axes detected by the three-axis angular velocity sensor.

5. The posture estimating apparatus of claim 2 further comprising an imaging unit,
wherein the operation acquires the plurality of images sequentially captured by the imaging unit, and the operation detects the motion vector of the feature point among the acquired plurality of images.

6. The posture estimating apparatus of claim 1, wherein the operation estimates the second direction by obtaining a rotation angle around the first axis by using a Kalman filter based on the obtained relative rotation angle around the first axis and the detected vector of the first direction.

7. The posture estimating apparatus of claim 1, wherein the second direction is a direction of gravity and the first axis includes at least one of a roll axis and a pitch axis of a body of the posture estimating apparatus.

8. The posture estimating apparatus of claim 1, wherein the acceleration sensor includes a three-axis acceleration sensor configured to detect acceleration in each of the directions of three axes of a body of the posture estimating apparatus lying at right angles to each other,
wherein the operation detects the vector of the first direction based on a time average of the output signal of the acceleration in the directions of the three axes detected by the three-axis acceleration sensor.

9. A posture estimating method performed by a posture estimating apparatus comprising:
   detecting a vector of a first direction based on an output signal from an acceleration sensor;
   acquiring a plurality of images sequentially captured;
   obtaining a relative rotation angle around a first axis among the plurality of images based on the acquired plurality of images; and
   estimating a second direction different from the first direction based on the obtained relative rotation angle around the first axis and the detected vector of the first direction.

10. The posture estimating method of claim 9 further comprising detecting a motion vector of a feature point among the acquired plurality of images, that obtains the relative rotation angle around the first axis among the plurality of images based on the detected motion vector.

11. The posture estimating method of claim 10 further comprising detecting an angular velocity around the first axis based on an output signal from an angular velocity sensor, that obtains the relative rotation angle around the first axis based on the detected angular velocity around the first axis in the case that the motion vector cannot be detected.

12. The posture estimating method of claim 10 further comprising capturing a plurality of images sequentially, that detects the motion vector of the feature point among the plurality of images sequentially captured.

13. The posture estimating method of claim 9, wherein estimating estimates the second direction by obtaining a rotation angle around the first axis of the posture estimating apparatus by using a Kalman filter based on the obtained relative rotation angle around the first axis and the detected vector of the first direction.

14. The posture estimating method of claim 9, wherein the second direction is a direction of gravity and the first axis includes at least one of a roll axis and a pitch axis of a body of the posture estimating apparatus.

15. A non-transitory computer-readable recording medium for recording a computer program, the computer program causing a processor of a posture estimating apparatus to perform operations to:
   detect a vector of a first direction based on an output signal from an acceleration sensor;
   acquire a plurality of images sequentially captured;
   obtain a relative rotation angle around a first axis among the plurality of images based on the acquired plurality of images; and
   estimate a second direction different from the first direction based on the obtained relative rotation angle around the first axis and the detected vector of the first direction.

16. The non-transitory computer-readable recording medium of claim 15, wherein the computer program causes the processor to further perform an operation to detect a motion vector of a feature point among the acquired plurality of images,
   wherein the operation obtains the relative rotation angle around the first axis among the plurality of images based on the detected motion vector.

17. The non-transitory computer-readable recording medium of claim 16, wherein the computer program causes the processor to further perform an operation to detect an angular velocity around the first axis based on an output signal from an angular velocity sensor,
   wherein the operation obtains the relative rotation angle around the first axis based on the detected angular velocity around the first axis in the case that the motion vector cannot be detected.

18. The non-transitory computer-readable recording medium of claim 16, wherein the posture estimating apparatus further comprises an imaging unit,
   the operation acquires the plurality of images sequentially captured by the imaging unit, and the operation detects the motion vector of the feature point among the acquired plurality of images.

19. The non-transitory computer-readable recording medium of claim 15, wherein the operation estimates the second direction by obtaining a rotation angle around the first axis of the posture estimating apparatus by using a Kalman filter based on the obtained relative rotation angle around the first axis and the detected vector of the first direction.

20. The non-transitory computer-readable recording medium of claim 15, wherein the second direction is a direction of gravity and the first axis includes at least one of a roll axis and a pitch axis of a body of the posture estimating apparatus.

* * * * *